US012111334B2

(12) United States Patent
Kulkarni et al.

(10) Patent No.: US 12,111,334 B2
(45) Date of Patent: Oct. 8, 2024

(54) VEHICLE WHEEL SPEED SENSOR USING ACCELEROMETER

(71) Applicant: HORIZON GLOBAL AMERICAS INC., Plymouth, MI (US)

(72) Inventors: Chandrakumar Kulkarni, Battle Creek, MI (US); Stephen James Thomas, Whitmore Lake, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 554 days.

(21) Appl. No.: 16/770,107

(22) PCT Filed: Dec. 7, 2018

(86) PCT No.: PCT/US2018/064450
§ 371 (c)(1),
(2) Date: Jun. 5, 2020

(87) PCT Pub. No.: WO2019/113430
PCT Pub. Date: Jun. 13, 2019

(65) Prior Publication Data
US 2020/0348327 A1 Nov. 5, 2020

Related U.S. Application Data

(60) Provisional application No. 62/595,816, filed on Dec. 7, 2017.

(51) Int. Cl.
*G01P 3/44* (2006.01)
*B60T 8/17* (2006.01)
*B60T 8/171* (2006.01)
*B60T 8/32* (2006.01)
*G01P 3/00* (2006.01)

(52) U.S. Cl.
CPC ............ *G01P 3/443* (2013.01); *B60T 8/1708* (2013.01); *B60T 8/171* (2013.01); *B60T 8/323* (2013.01)

(58) Field of Classification Search
None
See application file for complete search history.

(56) References Cited

U.S. PATENT DOCUMENTS

| 8,700,285 B2* | 4/2014 | Barlsen ................. B60Q 1/305 701/2 |
| 2010/0010770 A1 | 1/2010 | Helck |
| 2015/0166072 A1* | 6/2015 | Powers ................. G08G 1/015 701/1 |
| 2018/0154874 A1* | 6/2018 | Kulkarni ................. B60T 7/20 |

FOREIGN PATENT DOCUMENTS

DE 102009047679 6/2011

OTHER PUBLICATIONS

Patent Cooperation Treaty (PCT), International Search Report and Written Opinion for Application PCT/US2018/064450 filed Dec. 7, 2018, mailed May 10, 2019, International Searching Authority, EP.

* cited by examiner

*Primary Examiner* — Adam D Tissot

(57) ABSTRACT

System, method, and devices related to a wheel speed sensor that includes a wireless communication device and a motion sensor. The motion sensor includes an accelerometer. The wireless communication device and motion sensor are disposed in a housing. The housing is attached to an attachment member. The attachment member is selectively attached to a wheel of a towed vehicle.

10 Claims, 12 Drawing Sheets

VEHICLE WHEEL SPEED SENSOR USING ACCELEROMETER

CROSS-REFERENCE TO RELATED APPLICATION

This application claims priority to U.S. Provisional Patent Application No. 62/595,816 entitled "VEHICLE WHEEL SPEED SENSOR USING ACCELEROMETER," filed on Dec. 7, 2017, which is incorporated herein by reference in its entirety.

TECHNICAL FIELD

This disclosure relates to a brake controller device and wheel speed sensor, system and method for controlling brakes of a trailer with a brake controller device and wheel speed sensors, and more specifically, a brake controller system to control trailer brakes based on wheel speed sensor measurements is described herein.

BACKGROUND

A variety of brake controllers may be employed to control the brakes of a towed vehicle. Typically, the brake controller may actuate the towed vehicle's brakes in response to braking by the towing vehicle. These brake controllers may often include accelerometers and microprocessors which may measure and/or take into account a variety of conditions (e.g., braking signal, acceleration, etc.), whereby the brake controller may apply the towed vehicle's brakes in such a manner that assists in stopping the towing vehicle and towed vehicle, and may also reduce the likelihood of an unsafe driving condition.

The brake controller is often mounted to the towing vehicle. Typically, the brake controller may be hard-wired to the towing vehicle, such as being mounted in the cab or passenger compartment of the towing vehicle. The brake controller may communicate with the brake system of the towed vehicle by means of a wiring system that may provide communication between the towing vehicle's brake system and the towed vehicle's brake system.

There is a need in the art for a sensor that measures wheel speed of a towing vehicle or towed vehicle and can communicate the wheel speed with a brake controller.

SUMMARY

The present disclosure includes a system, method, and devices related to data collection and communication of the performance of various vehicle accessories and systems. These accessories and systems are described in greater detail below, and any combination of elements and/or methods are contemplated as aspects and embodiments of the overall invention.

Described herein is a wheel speed sensor device for a towed vehicle, comprising a housing, an accelerometer housed within the housing, a wireless communication device coupled to the accelerometer and housed within the housing, and an attachment member operatively attaching the housing to a wheel of the towed vehicle. The wireless communication device is a BLUETOOTH device. The attachment member is removably attachable to the wheel. The attachment member may be removably attachable to a lug nut of the wheel. The wheel speed sensor may include a setscrew that operatively tightens or loosens the attachment member to the wheel. The wheel speed sensor device may include a power source operatively coupled to the accelerometer and the wireless communication device and housed within the housing. The power source may comprise a rechargeable power source. The power source operatively recharges via kinetic energy. In another aspect, the power source may comprise a disposable power source.

Also described is a wheel speed sensor system for a towed vehicle, comprising a housing, an accelerometer housed within the housing, a wireless BLUETOOTH device communication device coupled to the accelerometer and housed within the housing, and an attachment member operatively attaching the housing to a wheel of the towed vehicle. The BLUETOOTH device of the sensor may be in communication with a mobile device while the mobile device calibrates a position of the sensor. The attachment member may be operatively and removably attached to the housing. The attachment member may be attachable to the housing in one orientation so that the housing may be removed and attached to the attachment member without needing to calibrate the wheel speed sensor device when reattached. The wheel speed sensor system may further comprise a brake control unit operatively controlling brakes of a towed vehicle and in communication with the wireless BLUETOOTH device.

A method of calibrating a wheel speed sensor is also described. The method may include positioning a wheel speed sensor device on a wheel comprising an accelerometer, receiving, by a user device, positional information associated with the wheel speed sensor device, determining, by the user device, whether a position of the wheel speed sensor should be altered based at least in part on the positional information associated with the wheel speed sensor; and in response to determining that the position should be altered, generating one or more instructions that identify how the position should be altered. Positioning the wheel speed on the wheel may comprise positioning the wheel speed sensor on a lug nut of the wheel. The one or more instructions may identify instructions to move the wheel speed sensor device such that at least one sensitive axis of the accelerometer is generally tangential to a circle defined by a lug nut of the wheel. The positional information associated with the wheel speed sensor device may comprise measurements from the accelerometer. The positional information associated with the wheel speed sensor device may comprise captured images of the wheel speed sensor device. Positioning the wheel speed on the wheel may further comprise positioning the wheel speed sensor on a lug nut of the wheel.

The foregoing embodiments are merely exemplary of some of the aspects of the system. Additional features and elements may be contemplated and described herein. Also, features from one of the foregoing embodiments may be combined with features from any of the other foregoing embodiments.

DETAILED DESCRIPTION

Figure 1:
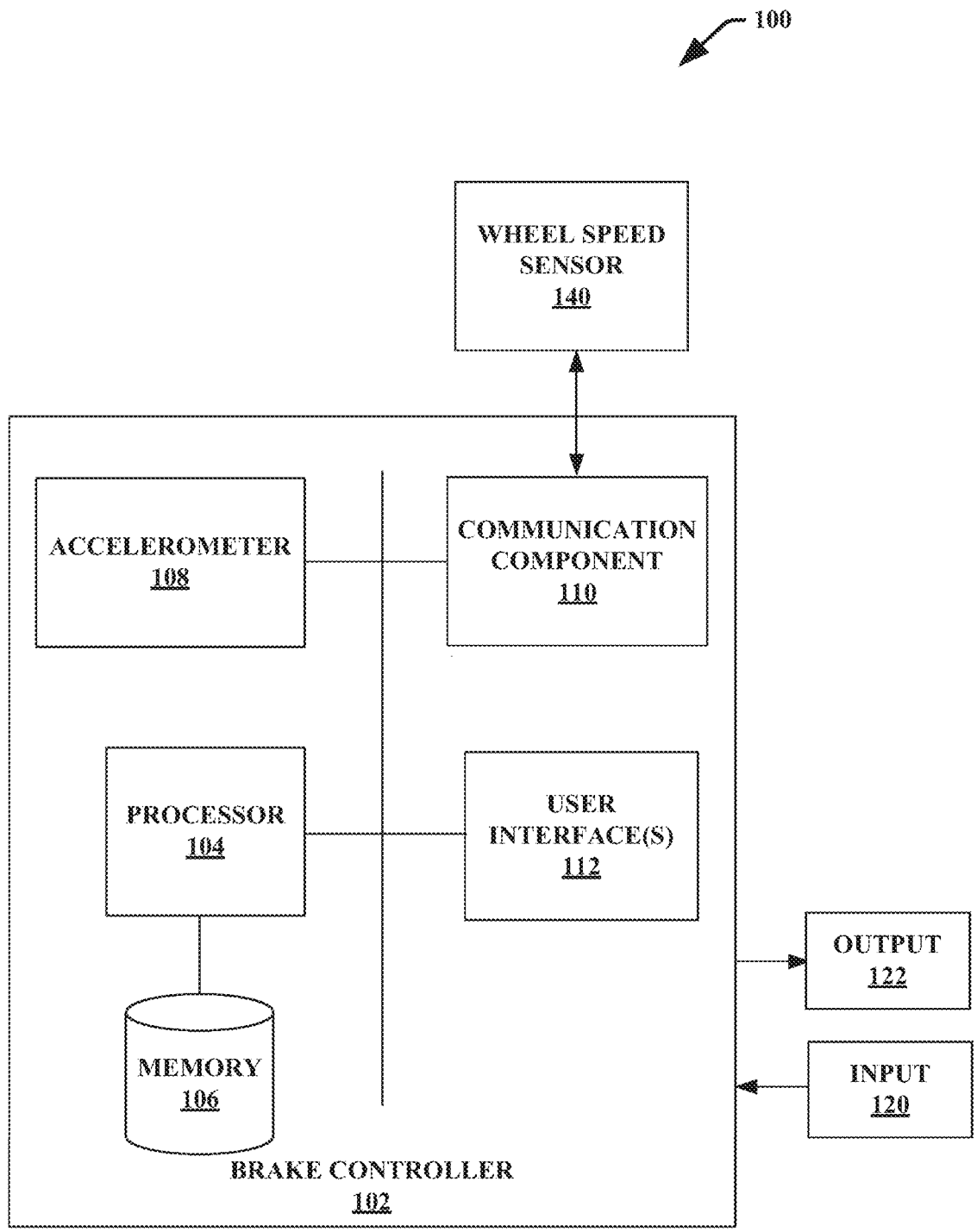
FIG. 1 is a functional schematic diagram of a brake controller system including a wheel speed sensor of the present disclosure.

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device. Furthermore, the terms "user," "customer," "consumer," and the like are employed interchangeably throughout the subject specification, unless context suggests otherwise or warrants a particular distinction among the terms. It is noted that such terms may refer to human entities or automated components supported through artificial intelligence (e.g., a capacity to make inference). As such, embodiments may describe a user action may not require human action.

"User equipment," "device," "user equipment device," "client," and the like are utilized interchangeably in the subject application, unless context warrants particular distinction(s) among the terms. By way of example, user equipment may comprise an electronic device capable of wirelessly sending and receiving data. A user equipment device may have a processor, a memory, a transceiver, an input, and an output. Examples of such devices include cellular telephones (e.g., smart phones), personal digital assistants (PDAs), portable computers, tablet computers (tablets), hand held gaming counsels, wearables (e.g., smart watches), global positioning system (GPS) devices, and the like.

As used herein, a towing vehicle may include various types of automobiles (e.g., car, truck, recreational vehicle ("RV"), etc.). A towed vehicle may include trailers (e.g., agricultural trails, boat trailers, etc.), an automobile, or the like. It is noted that various combinations of towed vehicles and towing vehicles may utilize some or all aspects of this disclosure.

Disclosed embodiments may refer to a brake controller, brake controller device, or the like. Such terms are used interchangeably to describe electronic devices that control the brakes of a trailer or towed vehicle. For instance, a brake controller may comprise a unit that is mounted in or on a towing vehicle. The towing vehicle is attached to a towed vehicle (e.g., via a hitch or the like). The towing vehicle may pull, push, or otherwise tow the towed vehicle. The brake controller system may monitor acceleration and application of a brake pedal to control the brakes of the towed vehicle to operatively apply (e.g., engage, release, etc.) the towed vehicle brakes. Moreover, while embodiments may refer to a brake controller system comprising various components, such components may be a single device or multiple devices in communication with each other. For example, a brake controller may include a display, a processing unit, and an accelerometer. These components may be comprised within a single housing or in multiple housings. The components may include wiring, circuitry, or the like. In at least one embodiment, a brake controller may be mounted in or on a towing or towed vehicle. Other components may include anti-sway devices, converters, trailer breakaway systems, tire pressure monitoring systems for trailers, vehicle speed monitoring systems, user equipment devices, internet or network connected devices, external cameras, and the like.

Disclosed embodiments may include user interfaces. As used herein, a user interface may include devices that receive input from a user and transmits the input to electronic circuitry, such as a microprocessor, or outputs information from electronic circuitry to a user. Such user interfaces may include buttons, switches, knobs, touch screens (e.g., capacitive touch screens), microphones, image capturing devices, motion sensors, pressure sensors, a display screen, a speaker, a light (e.g., LED, bulb, etc.), or the like. For brevity, examples may be described with reference to a user interface in general rather than any particular type of user interface. It is noted that brake controllers may include multiple user interfaces of various types.

Networks or communication networks may include wired or wireless data connections to a network (e.g., Ethernet, Wi-Fi, cellular network, local area connections, etc.). Embodiments, for example, may utilize various radio access network (RAN), e.g., Wi-Fi, Wi-Fi direct, global system for mobile communications, universal mobile telecommunications systems, worldwide interoperability for microwave access, enhanced general packet radio service, third generation partnership project long term evolution (3G LTE), fourth generation long term evolution (4G LTE), third generation partnership project 2, BLUETOOTH®, ultra mobile broadband, high speed packet access, $x^{th}$ generation long term evolution, or another IEEE 802.XX technology. BLUETOOTH (in any of its various iterations), various wireless technologies for exchanging data over short distances (e.g., ZigBee, RuBee, DASH7, etc.), and other protocols and personal area networks may be utilized. Wireless communication may also include, in whole or in part, communications transmitted over more traditional local area networks (including such networks provided by the vehicle and/or trailer/towed product) or cellular data networks, so as to incorporate aspects of cloud-based computing systems, information available via world wide web and other internet connectivity, and the like. As such, any indication of "wireless," "Wi-Fi," or other similar terminology should be read expansively (at least within the context it is used) throughout this disclosure. Moreover, embodiments may use one or more different communications protocols or devices (whether wired or wireless) to communicate between the various components of the system.

In some traditional after marked brake controllers, braking is more efficient at low speeds. Those brake controllers, however, do not adjust braking output to a trailer based on the speed. This may result in towed vehicle lock up at low speeds. Moreover, traditional brake controllers may not efficiently determine whether a wheel lock up condition is occurring and may not be able to identify one or more particular wheels that have locked up. As such, brake controllers may not be able to identify corrective actions to take so that a wheel lock up condition is resolved.

Moreover, while towing vehicles may measure wheel speed with hall effect sensors that communicate the speed over a communication bus to a display on the towing vehicles' dashes, the towing vehicles' wheel speed sensors are generally not available for aftermarket brake controllers. These towing vehicle wheel speed sensors are also not available for towed vehicle wheels.

Described embodiments include a wheel speed sensor for a towed or towing vehicle that comprises an accelerometer, a wireless communication device, a power source, and a controller. The wheel speed sensor may be attached to a portion of a wheel, such as a lug nut. It is noted that attached to a lug nut includes attachment to the lug nut, a thread member that receives a lug nut, or the like. For sake of brevity, examples may simply refer to attachment to a lug nut. Moreover, examples may identify measuring wheel speed of at least one wheel of the towed vehicle or towing vehicle. It is noted, however, that embodiments may include wheel speed sensors attached to one, some, or all wheels of the towed vehicle or towing vehicle. As described herein, the wheel speed sensor may be removably coupled to the wheel. In some embodiments, a user may remove the wheel speed sensor from the wheel to charge or replace a battery of the wheel speed sensor.

The wheel speed sensor may measure a wheel speed of the towing or towed vehicle and may transmit the sensed speed to a brake controller. In at least one embodiment, the wheel speed sensor measures the speed of at least one wheel of the towed vehicle. Disclosed brake controllers may utilize the sensed wheel speed to control the brakes on the trailer. For instance, a brake control may utilize the speed to adjust the brake control output sent to trailer brakes, automatically set gain setting, and measure the deceleration of the towed vehicle. The brake controller, or a user device, may further utilize the wheel speed sensor to determine or calculate the amount of time (e.g., number of hours) the towing vehicle is in use. It is further noted that the wheel speed sensor may measure the time of operation of the towing vehicle, distance of the towing vehicle, or other information.

In embodiments, the wireless communication device may communicate the sensed speed over the air to user devices (e.g., mobile phones, etc.) or a brake controller. As an example, the wireless communication device may comprise a short distance wireless network, mobile network, or the like. In some embodiments, the wireless communication device may comprise a BLUETOOTH device that communicates with another BLUETOOTH device of a user device or brake controller, a Wi-Fi device that communicates directly or indirectly with a user device, etc.

Turning now to FIG. 1, there is a functional block diagram of a brake controller system 100 for controlling trailer brakes of a towed vehicle in accordance with various disclosed embodiments. As described herein, the brake controller system 100 may be a proportional or inertia based system for a towing and towed vehicle system.

Brake controller system 100 may primarily include a processor 104, a memory 106, an accelerometer 108, a communication component 110, a wheel speed sensor 140, and user interface(s) 112. It is noted that memory 102 may store computer executable instructions which may be executed by processor 104. In an aspect, instructions may include control instructions that control or instruct the various components described herein. Furthermore, while embodiments may reference user actions, it is noted that users (e.g., humans, etc.) may not be required to perform such actions. Exemplary, non-limiting brake controller units are disclosed in U.S. Pat. Nos. 6,012,780; 6,068,352; 6,282,480; 6,445,993; 6,615,125; 8,746,812; 8,789,896; and 9,150,201.

The accelerometer 108 may comprise an inertia sensor, such as a single or multi-axis accelerometer (e.g., two-axis, three-axis, etc.), gyroscope, or the like. It is noted that various types of accelerometers may be utilized. While described as a single accelerometer, the accelerometer 108 may comprise multiple accelerometers that may be utilized to measure forces. The accelerometer 108 may comprise circuitry or mechanical components that are responsive to changes in forces, such as changes in acceleration. The accelerometer 108 may be communicated to other components of the brake controller 102 such as the processor 104. For example, the brake controller 102 may be mounted in a cab of a towing vehicle. When the towing vehicle changes its speed and/or travels on a different road grade, the accelerometer 108 may generate an output that represents different values. This output may be received by the processor 104. The output may comprise an electric signal that varies based on the magnitude of acceleration.

User interface(s) 112 may comprise input or output devices as described herein. For example, the user interface(s) 112 may include push buttons, display screen, audio input or output devices, and the like. The user interfaces(s) 112 may be coupled to the processor 104 to communicate information to or from a user. For example, the user interface(s) 112 may include a display that is controlled by the processor 104 to generate output 122 in the form of graphical information. In another instance, the user interface(s) 112 may include push buttons that receive input 120 from a user and transmit the input to 120 to the processor 104 (e.g., manual brake application, sensitivity adjustments, etc.). In at least some embodiments, the user interface 112 may comprise a user device, such as a mobile communication device (e.g., smart phone, tablet computer, wearable device, etc.).

Communication component 110 may comprise one or more communication devices that may receive input 120 and transmit output 122. The communication component 110 may comprise hardware, software, and/or a combination of hardware and software. According to embodiments, the communication component 110 may comprise electrical circuitry that facilitates wired or wireless communication. For example, the communication component 110 may comprise a BLUETOOTH® transmitter/receiver. In another example, the communication component 110 may comprise a wire jack, such as an Ethernet connector, USB port, or the like. It is noted that the communication component 110 may include a device that may be disposed within a housing of the brake controller 102 or may be an external device connected to the brake controller 102.

In embodiments, the communication component 110 may wireless communicate with a wheel speed sensor 140. The wheel speed sensor 140 may be coupled to a wheel of a towed vehicle or towing vehicle, or both, and may measure changes in angles or orientation of the wheel. In an aspect, the wheel speed sensor 140 may determine a speed of rotation of the wheel as described herein. Moreover, the system 100 may include different numbers of wheel speed sensors that may measure the speed of different wheels. The brake controller 102 or other device may receive output from the various wheel speed sensors to determine, for example, gain settings, boost settings, brake output to the trailer brakes, wheel lock-up conditions, conditions of the trailer (e.g., alignment, slippage of a wheel, sway conditions, etc.), or the like.

Figure 2:
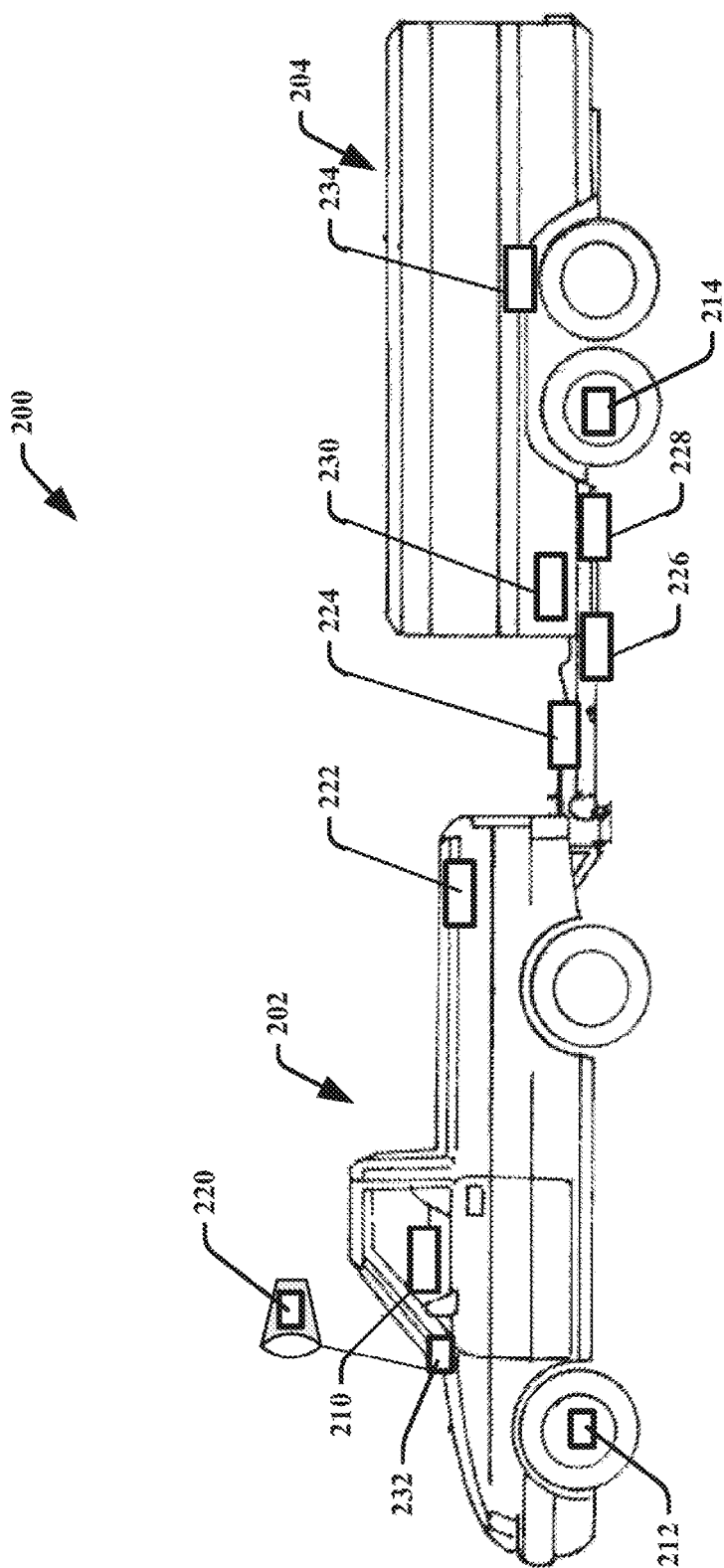
FIG. 2 is a schematic side view of an embodiment of a brake controller system with a towing and towed vehicle including a wheel speed sensor in accordance with the present disclosure.

Turning now to FIG. 2, there is an exemplary diagram of a brake controller system 200 for a towing vehicle 202 and a towed vehicle 204. A brake controller 210 may be mounted in the towing vehicle 202. The brake controller 210 may be operatively connected to brakes (not shown) of the towed vehicle 204. The brake controller 210 may operatively apply the brakes of the towed vehicle 204 according to a desired amount of stopping force. The brake controller system 200 may comprise all or some aspects described with reference to the brake controller system 100 of FIG. 1.

The brake controller system 200 may include one or more wheel speed sensors 212 and 214. It is noted that brake controller system 200 may include additional or other wheel speed sensors that may be attached to one, some, or all wheels of a towing or towed vehicles. Moreover, a plurality of wheel speed sensors may be attached to a wheel. Thus, examples may refer to wheel speed sensors 212 or 214 for sake of brevity as various other wheel speed sensors may be utilized. The wheel speed sensors 212 or 214 may measure the speed of the towing vehicle 202 or towed vehicle. It is noted that while described wheel speed sensors (e.g., wheel speed sensor 140) are generally attached to a towed vehicle, they may be attached to a towing vehicle 202. A user may identify locations of the wheel speed sensors 212 or 214 via a user device, brake controller or the like.

As described above, examples may refer to "speed" as either the towing or towed vehicle speed. Moreover, examples may describe aspects or processes associated with speed sensor 212 for brevity. Such processes may also be performed by speed sensor 214 or other sensors as described herein unless noted otherwise.

The speed sensor 212 may comprise an accelerometer, gyroscope, or other electronic device. The speed sensor 212 may be mounted on a wheel, axle, a lug nut, or other portion of the towing or towed vehicle as described herein. For instance, an accelerometer may be mounted on a lug nut. As the wheel rotates, the accelerometer may determine wheel speed. For instance, the accelerometer's first axis may be used to sense the rotation of the wheel. The first axis is the axis that is closest to being tangential to the circumference of the tire or perpendicular to it. Note that besides the rotation, the accelerometer is also affected by the deceleration of the vehicle. The accelerometer output changes in a sinusoidal fashion as the wheel rotates. Thus, the rotation of the wheel angle as a function of time can be measured. This $d\theta/dT$ is measured as a function of the brake output (e.g., voltage, power, current, etc.) sent to or calculated for the trailer brakes and may represent the braking intent. The lower the $d\theta/dT$ for a given brake voltage, the higher the effective $\mu$ of the road surface and more effective the brakes may be or the lighter the trailer may be. Accordingly, the brake controller 210 may utilize the input from the speed sensors 212, 214 to set various parameters, such as automatically selecting a lower gain and less aggressive transfer function, including lower boost level. If the $d\theta/dT$ is higher, the higher the effective $\mu$ and the brake controller 210 will select a lower value of gain and more aggressive transfer function, including higher boost level.

It is noted that the speed may be communicated from the speed sensor 212 to the brake controller 210, such as via a BLUETOOTH® module, or other communication protocol. In another aspect, the deceleration may be communicated from the speed sensor 212, 214 to the brake controller 210. In at least one embodiment, the brake controller 210 may not utilize an internal accelerometer in conjunction with the speed sensor 212, 214. In another example, the brake controller 210 may utilize an internal accelerometer in conjunction with the speed sensor 212, 214.

According to an embodiment, the brake controller 210 may store speed, acceleration, gain, transfer function, boost settings, or other information in a memory. The brake controller 210 may use this historical data to determine updated settings. For instance, if speed falls below a threshold value for a given braking power, the wheels may be in a locked state. The minimum value of braking power that puts the wheel in a locked state may represent the gain value. Thus, during regular braking events, 'gain' can be calculated and compared with old gain values. A lower gain compared with prior gain values can be utilized as a result of low $\mu$ road surface.

It is noted that the brake controller 210 may receive input from various other sensors or data collection/communication devices, examples of such are described in U.S. patent application Ser. No. 15/261,312, and various other sensors are described herein. In an example, sensors may include an environmental sensor 220 that may measure wind speeds, directions, humidity, or the like. The environmental sensor 220 may communicate collected measurements to the brake controller 210 via a communications protocol as described herein. In at least one embodiment, the brake controller 210 may receive such information from a network connected device (e.g., Internet connected device, cellular service connected device, etc.), user input, or the like.

In at least one embodiment, described wheel speed sensors may be utilized in combination with other sensors or systems. For instance, wheel speed sensors may be used with a fifth wheel hitch or gooseneck coupler and ball modules 222 may sense and collect various data parameters related to the function of a fifth wheel hitch or gooseneck coupler and ball and/or the conditions under which such operates. As an example, the module 222 may perform warranty or diagnostic type data collection as it relates to cycles, load, trip data, vibration profile, misuses occurred such as loading with jaws closed or highball attachment, age, and additional sensor information. A fifth wheel hitch and gooseneck coupler and ball module 222 may communicate data related to the function of a fifth wheel hitch or gooseneck coupler and ball and/or the conditions under which such operates. For instance, the module 222 may communicate data to identify goose pop up, connection of jaws, and second lock latch status. Further, the modules 222 may communicate diagnostic status such as hitch pin, load, and disconnect status. Additional sensed parameters may include usage, wear, safety chain engagement, actuation is open or closed, proximity to cab/trailer and connection or disconnection.

It is noted that a pin box module (not shown) may sense and collect various data parameters related to the function of a pin box and/or the conditions under which such operates. By way of a non-limiting example, the pin box module may perform warranty or diagnostic type data collection as it relates to load, cycles, auto inflate or deflate occurrences, connection, disconnect, trip data, and vibration profile. The pin box module may communicate various data parameters related to the function of a pin box and/or the conditions under which such operates. By way of a non-limiting example, the pin box module may communicate data to identify connection status, articulation proximity, and air ride. Further, the module 110F may communicate diagnostic status such as air bag failure, disconnection, load, high pin, and pressure. Additional sensed parameters may include, without limitation, auto inflate/deflate, load, tire pressure monitoring system (TPMS), and proximity. As noted herein, such sensed parameters may include other or different parameters. Exemplary parameters are provided for purpose of illustration.

A coupler module 224 may sense and collect various data parameters related to the function of a coupler and/or the conditions under which such operates. By way of a non-limiting example, the module 224 may perform warranty or diagnostic type data collection as it relates to a coupler safety pin, whether the coupler is connected or disconnected, load, usage, vibration profile, and misuse or wear. The coupler module 224 may communicate various data parameters related to the function of a coupler and/or the conditions under which such operates. By way of a non-limiting example, the module 224 may communicate data to identify connection status or the status of a second lock or catch. Further, the module 224 may communicate diagnostic status such as load, and disconnect status. Additional sensed parameters may include usage, wear, proximity to cab/trailer, connection or disconnection, and safety pin.

A jack assembly module 230 may sense and collect various data parameters related to the function of a jack assembly and/or the conditions under which such operates. By way of a non-limiting example, the module 230 may perform warranty or diagnostic type data collection as it relates to load, cycles, position of the jack (extended or retracted), travel, pivot, and lubrication. The jack assembly module 230 may communicate various data parameters related to the function of a jack assembly and/or the conditions under which such operates. By way of a non-limiting example, the module 230 may communicate data to identify position, load, and effort. Further, the module 230 may communicate diagnostic status such as cycles. Additional sensed parameters may include jail failure, wear/cycle, lubrication, electrical drive position or level, warnings for load or overload conditions, assist in hookup, and proximity related to jack stow or work positions.

A sway controller module 226 may sense and collect various data parameters related to the function of a sway controller and/or the conditions under which such operates. By way of a non-limiting example, the module 226 may perform warranty or diagnostic type data collection as it relates to road profile data, wheel speed, number of occurrence of sway control, the magnitude of occurrence of sway control, trailer conditions, gain, load, pin weight, and number of times a warning message is provided to the user. The sway controller module 226 may communicate various data parameters related to the function of a sway controller and/or the conditions under which such operates. By way of a non-limiting example, the module 226 may communicate data to identify outputs. Further, the module 226 may communicate diagnostic status such as if and/or when a sway event is in progress or has occurred. Additional sensed parameters may include when and/or if a warning/safety sway condition exists and wheel speeds at the time of the condition.

A weight distribution module 228 may sense and collect various data parameters related to the function of a weight distribution assembly and/or the conditions under which such operates. By way of a non-limiting example, the module 228 may perform warranty or diagnostic type data collection as it relates to cycles, load, usage, pads, profile, number of bar disconnects, clips, and trip data such as turns. The weight distribution module 228 may communicate various data parameters related to the function of a weight distribution assembly and/or the conditions under which such operates. By way of a non-limiting example, the module 228 may communicate data to identify a load, and a level. Further, the module 228 may communicate diagnostic status such as load, conditions, bar disconnect status, and friction pad wear. Additional sensed parameters may include usage, wear, load at head/base, level, proximity, missing clips, and special relationship to other assemblies such as motorized systems including jack assemblies.

A windshield wiper module 232 may sense, communicate, and collect various data parameters related to the function of a windshield wiper and/or the conditions under which such operates. By way of a non-limiting example, the module 232 may sense when windshield wipers are operating. If the wipers are operating over a set length of time (e.g., 10 seconds), the brake controller 210 may identify the possibility of wet weather.

It is noted that brake controller 210 may receive information from some, all or none of the described sensors or modules. Moreover, the brake controller 210 may communicate (wirelessly or via a wired connection) directly with the sensors or modules, and/or may communicate via a communications bus or hub.

Figure 3:
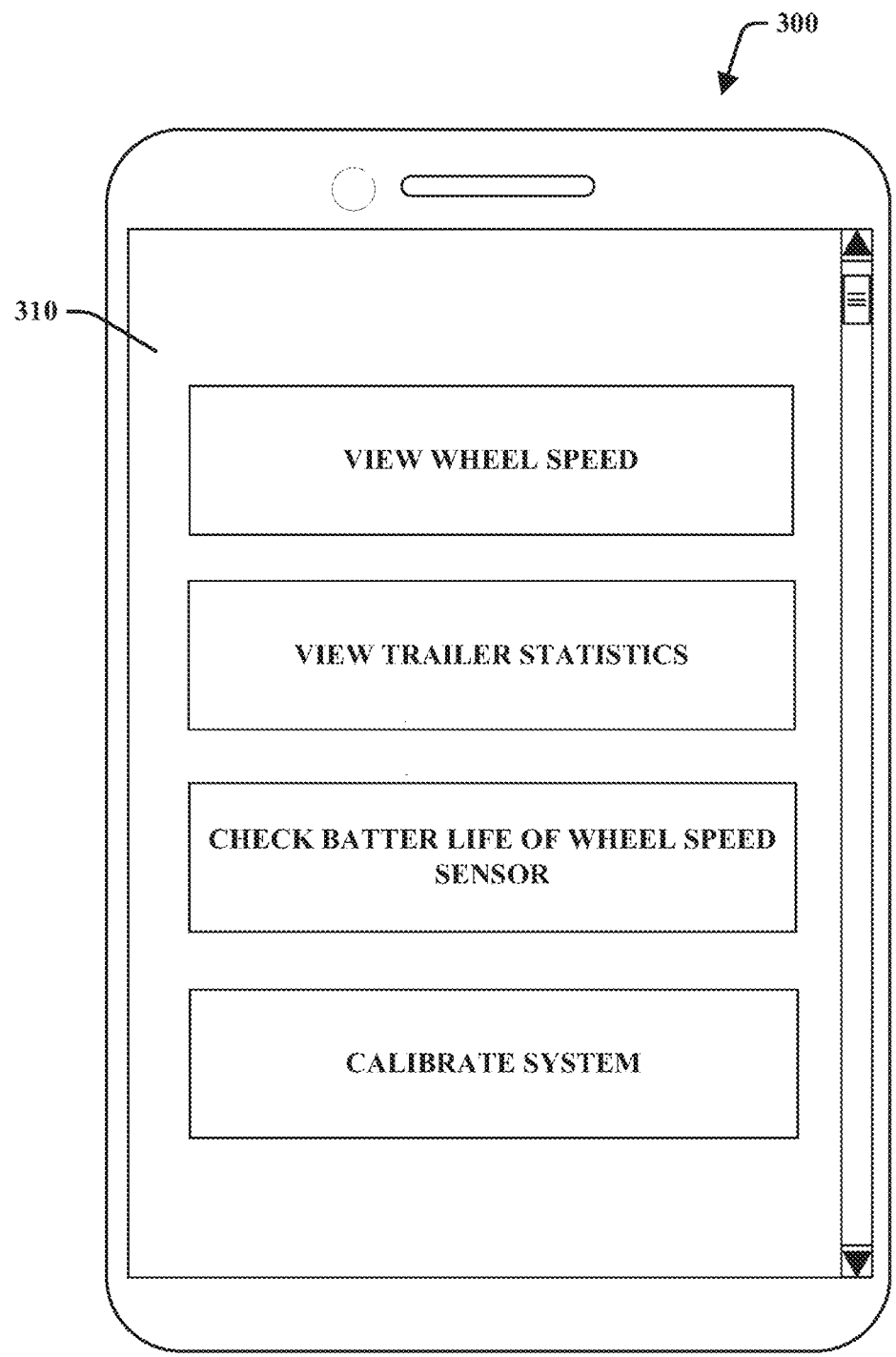
FIG. 3 is a user equipment device and interface that may be used with a including a wheel speed sensor in accordance with the present disclosure.

Moreover, the brake controller 210 may receive information from an internet or network connected user equipment device, such as smartphone 300 shown in FIG. 3. The smartphone 300 may include GPS capability, access to communication networks, and the like. In an example, the brake controller 210 may communicate with the smartphone 300 via a wireless connection. The brake controller 210 may receive information from the smartphone 300, such as weather forecasts, information about a current load, information regarding adjustments to braking settings and various other parameters. It is noted that the smartphone 300 may receive user input and/or may automatically retrieve information. In another aspect, the brake controller 210 may transmit data to the smartphone 300, such as historical and/or current information about the brake controller system 200.

FIG. 3 illustrates a user device 300 that may be utilized with various disclosed embodiments (e.g., system 100, system 200, etc.) The user device 300 may comprise various types of devices, such as a smart phone. The user device 300 generally include a display 310 and a communication device (e.g., BLUETOOTH device). It is noted that user may interact with the display 310 to instruct the user device 300 to perform various actions. Moreover, the user device 300 may be in communication with a wheel speed sensor, brake control device, or other device.

Figure 4:
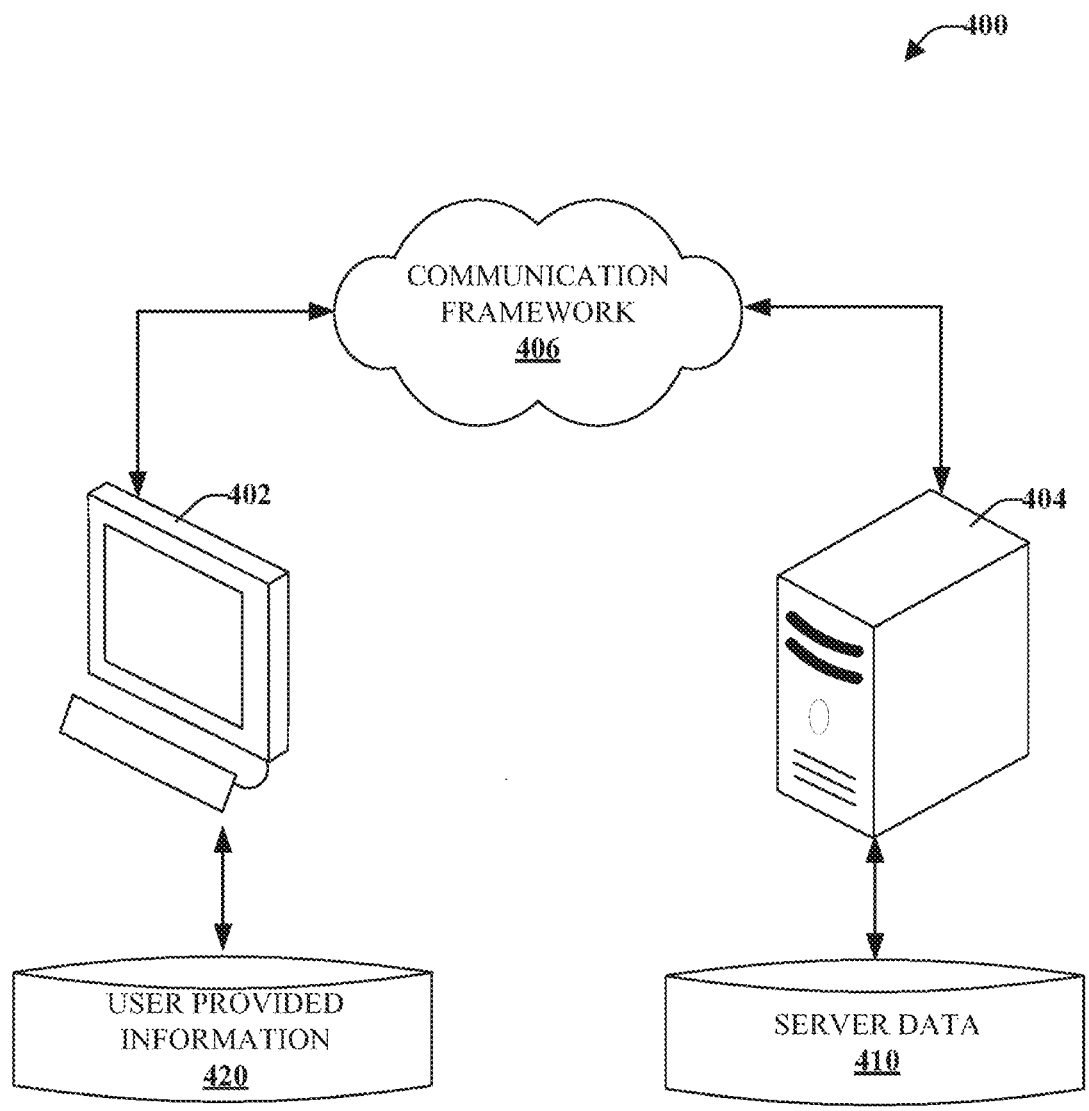
FIG. 4 is a schematic view of an embodiment of the data collection and communication system of the present disclosure.
Figure 5:
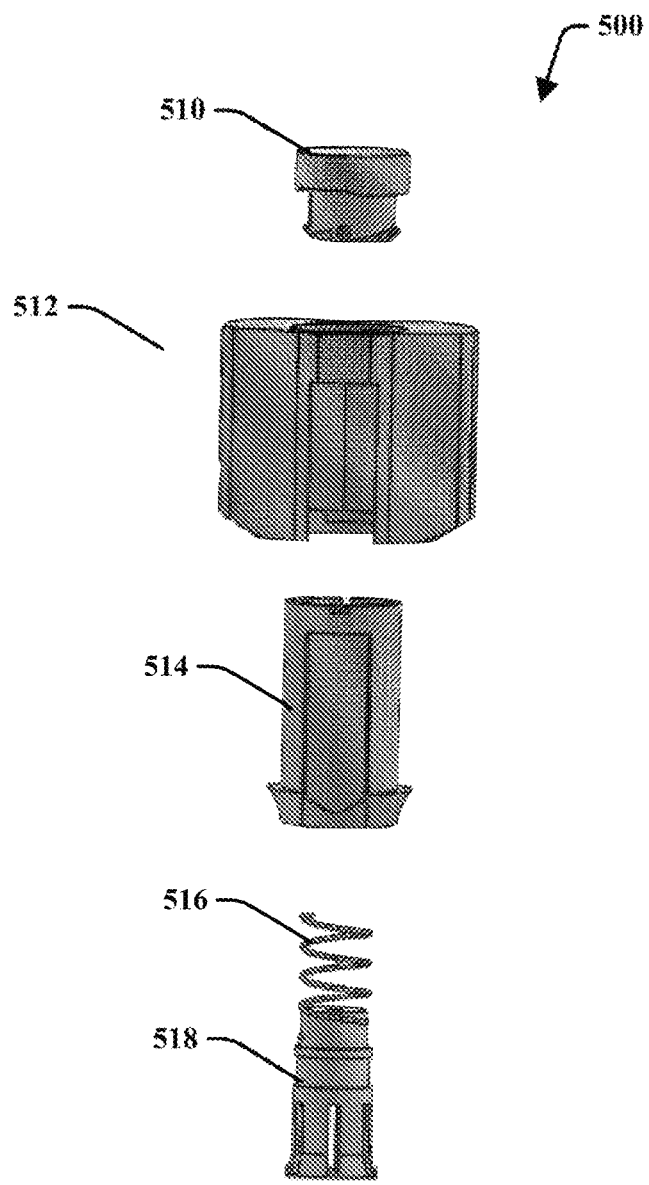
FIG. 5 is an exploded view of a wheel speed sensor of the present disclosure.
Figure 6:
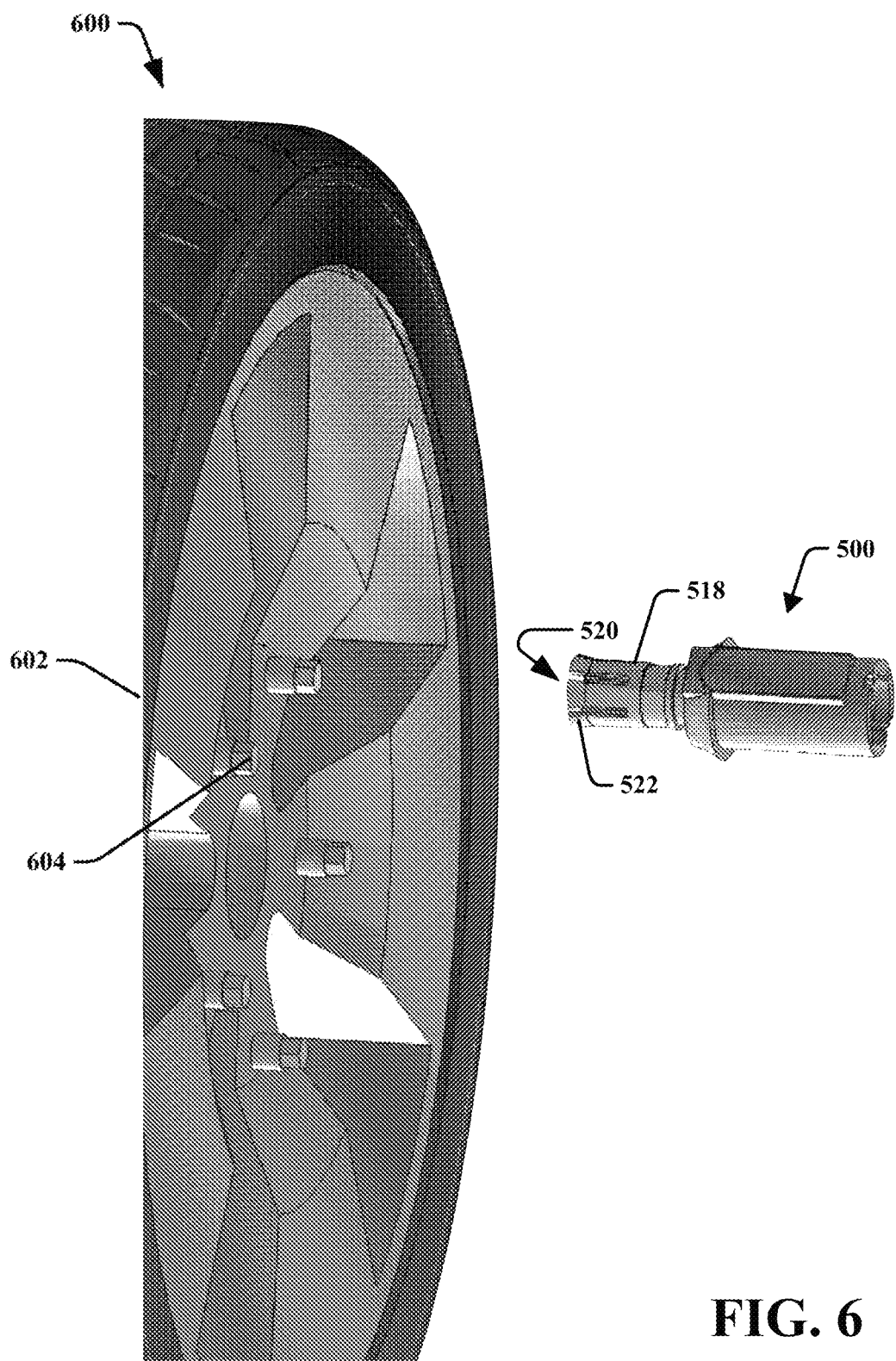
FIG. 6 is a side perspective view of the wheel speed sensor of FIG. 5 before it is attached to a wheel in accordance with the present disclosure.

FIG. 4 illustrates a network system architecture 400 that includes a communication framework 406 for collecting, processing, and communicating data. The communication framework 406 allows data to be sensed at a particular towing system of the towed and towing vehicles. An interface device 402 may be in communication with a computer/processor 404 by way of the communication framework 406 such as the internet, network, or cloud as is generally known in the art or as may be developed in the future. The processor 404 and communication framework 406 of the system architecture 400 may also include on on-line web server. The interface device 402 may be a computer, smartphone, tablet, brake controller, GPS device, laptop, or other device that is accessible by the user to access a website application. The towing system device modules 410 may be in communication with the computer/processor 104 by way of the communication framework 406.

The computer/processor 404 of the network system 400 may include a database that is configured to receive the sensed data from at least one towing system device module. Sensed data may be collected through the communication framework 406 and stored at the database maintained within the computer/processor 404. The collection of sensed data may then be processed to identify various data sets. The data sets may then be communicated to the interface device 402. The network system 400 may process information and provide instructions to perform actions. As such, the network system 400 may be an active systems. It is noted that embodiments may comprise a passive or diagnostic system. Moreover, embodiments may include different modes (e.g., active and passive) that may be selectively engaged.

The data obtained from the system may permit the manufacturer to be more in touch with the end user. It may allow the manufacturer to provide users with recommendations as to the settings of the various towing accessory devices or uses of the towing accessory devices. For instance, a network system 400 may receive input from one or more users or user devices (e.g., smart phones communicatively coupled to a brake controller). The network system 400 may determine adjustments or best fit settings for a given user based on driving habits, load, a user's towed or towing vehicle, or the like. The best fit settings may be communicated to the user via an interface, such as a screen of a smart phone or display of a brake control unit. In another aspect, the best fit settings may be utilized to automatically adjust settings of a brake controller without requiring user action to approve the modifications or enter the adjustments. It is noted, however, that some embodiments may allow a user to opt-in or opt-out of automatic updates. Moreover, a user may be prompted to provide input to approve the automatic updates.

Figure 11:
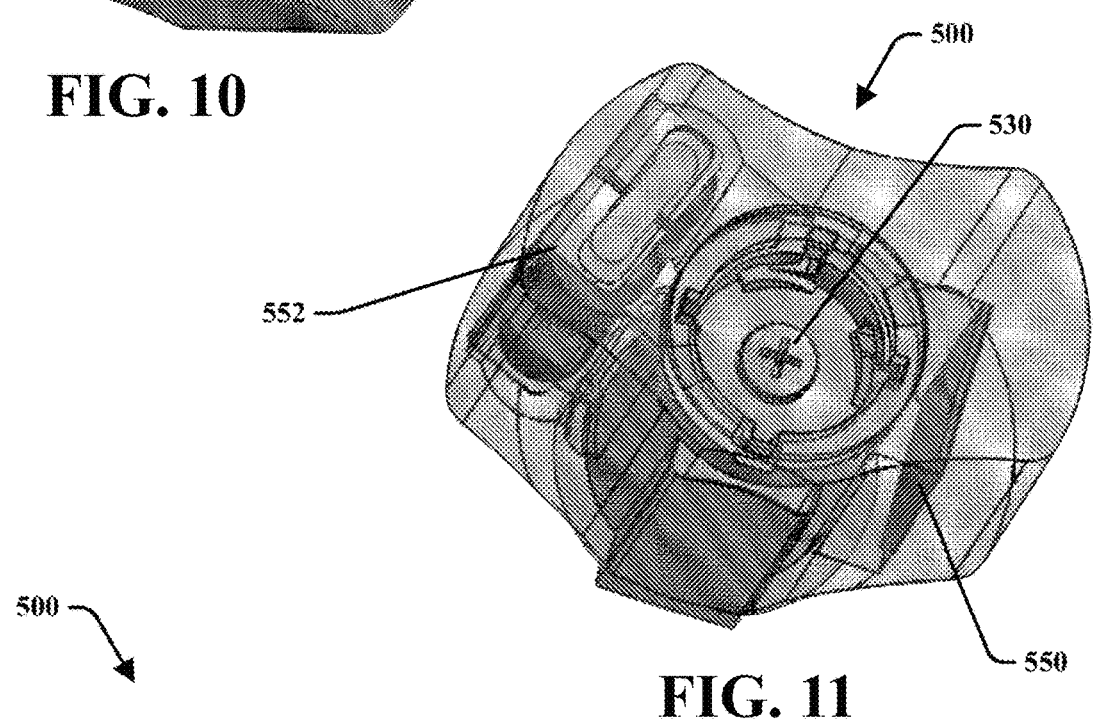
FIG. 11 is a top, perspective and cross-sectional view of the wheel speed sensor of FIG. 5 in an untightened position in accordance with the present disclosure.
Figure 12:
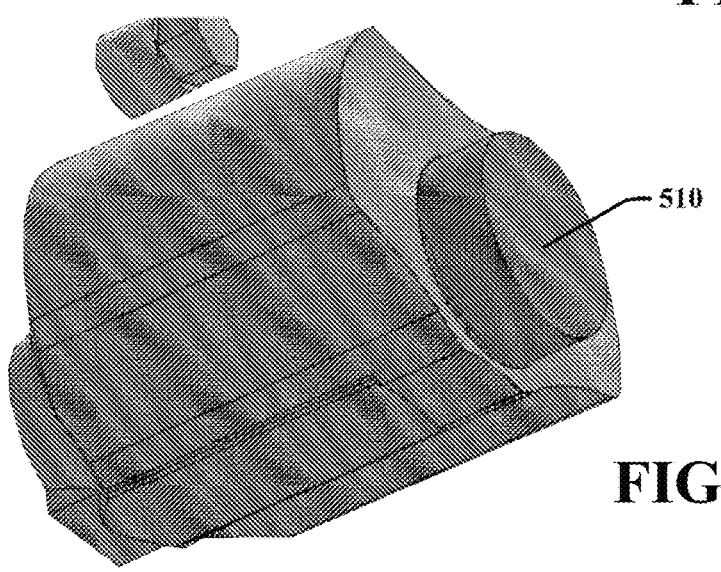
FIG. 12 is a top, perspective view of the wheel speed sensor of FIG. 5 with the cap attached thereto in an untightened position in accordance with the present disclosure.

Turning to FIGS. 5-12, there is a wheel speed sensor 500 in accordance with various disclosed embodiments. The wheel speed sensor 500 may be operatively attached to a portion of a wheel 602, such as a lug nut 604. The wheel speed sensor 500 may primarily include a cap 510, a housing 512 (which may house a circuit board 550 and power source 552 as shown in FIG. 11), a setscrew 530, a setscrew sleeve 514, a biasing member or spring 516, and an attachment member 518.

The attachment member 518 may comprise one or more prongs 522 that may be flexible. The prongs 522 may define a generally annular opening 520. The prongs 522 may be pressed around a lug nut 604 such that the opening 520 receives at least a portion of the lug nut 604. It is noted that the prongs 522 may generally friction fit with the lug nut 604. In some embodiments, the attachment member 518 may include elastomeric materials, plastics, metals or the like.

Figure 7:
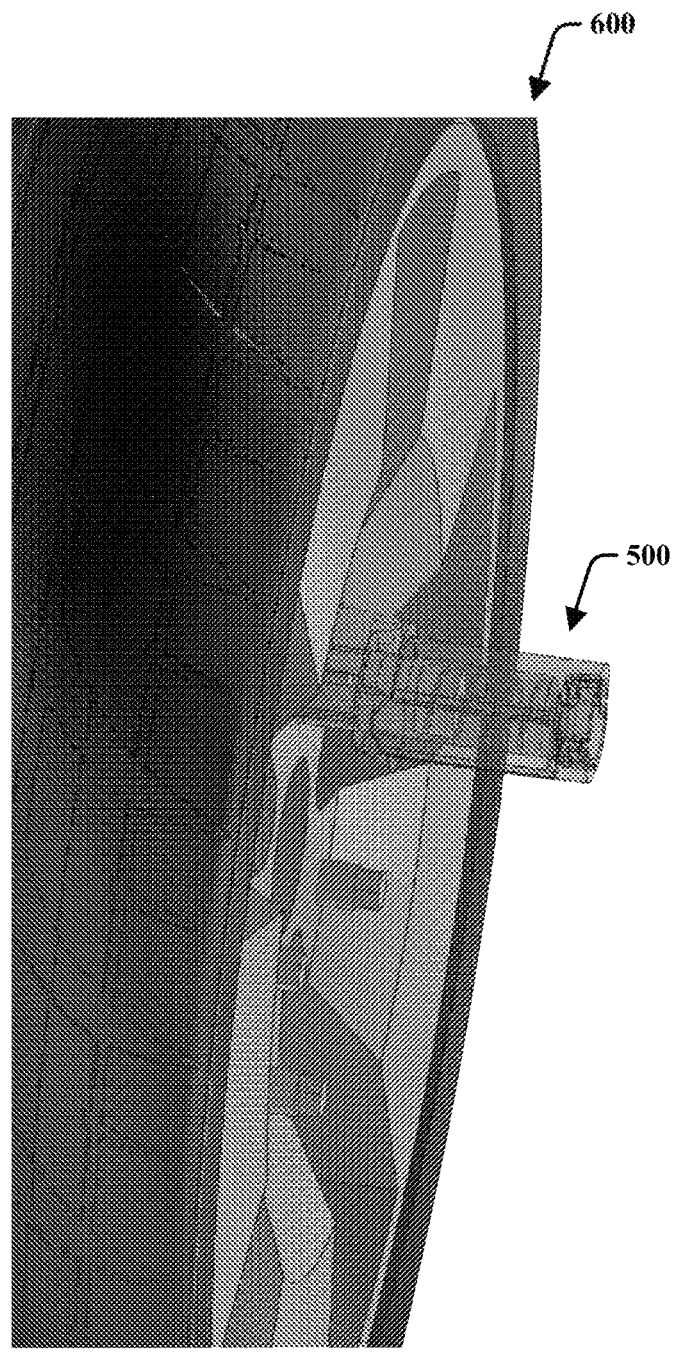
FIG. 7 is a side perspective view of the wheel speed sensor of FIG. 5 attached to a wheel but not tightened to the wheel in accordance with the present disclosure.

Once positioned on the lug nut 604, as shown in FIG. 7, the wheel speed sensor 500 may be fastened or secured by tightening the setscrew 530. For example, in an untightened position, the setscrew 530 extends from the attachment member 518. The spring 516 forces the setscrew sleeve 514 and the housing 512 away from the attachment member 518 such that the prongs 522 are free to flex around the lug nut 604. Moreover, a user may remove the wheel speed sensor 500 from the lug nut 604 or attach the wheel speed sensor 500 to the lug nut 604.

Figure 8:
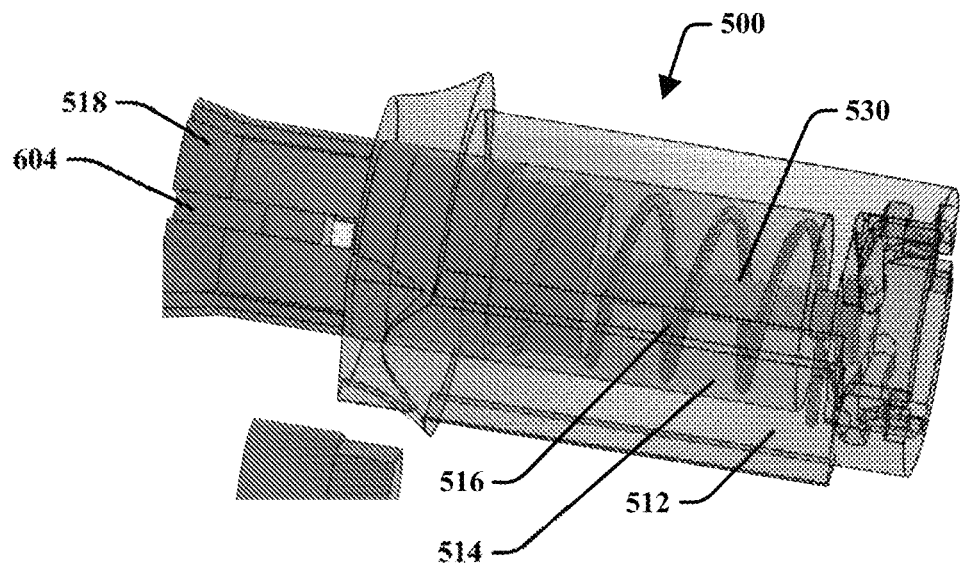
FIG. 8 is a side perspective view of the wheel speed sensor of FIG. 5 in an untightened position in accordance with the present disclosure.
Figure 9:
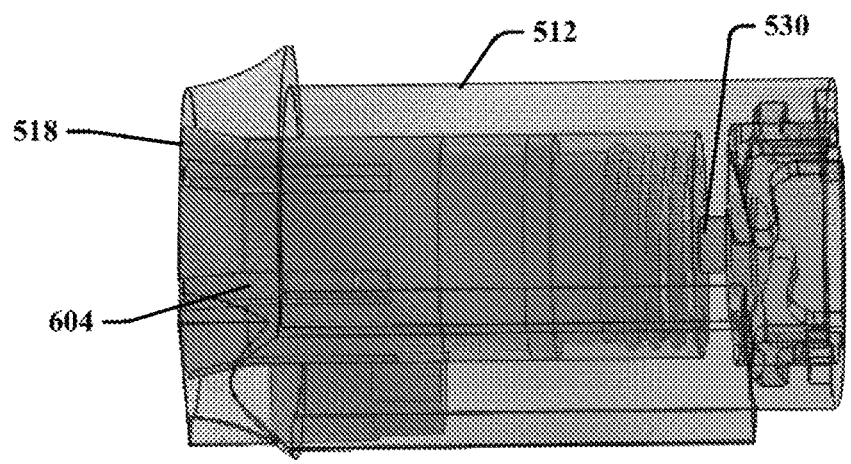
FIG. 9 is a side perspective view of the wheel speed sensor of FIG. 5 in a tightened position in accordance with the present disclosure.
Figure 10:
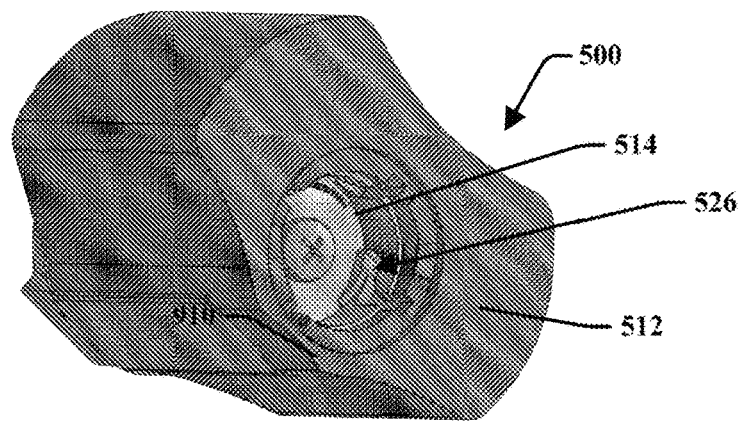
FIG. 10 is a top, perspective view of the wheel speed sensor of FIG. 5 in an untightened position in accordance with the present disclosure.

With reference to FIG. 8, as the setscrew 530 is tightened, the spring 516 is forced to compress and the setscrew sleeve 514 and the housing 512 are translated towards the wheel 604 and about the prongs 522. As the prongs 522 are received within the setscrew sleeve 514, the prongs 522 are compressed and tightened around the lug nut 604. This may operatively secure the wheel speed sensor 500 to the lug nut 604. Once the wheel speed sensor 500 is secured to the lug nut 604, the cap 510 may be attached to a chamber 526 defined by at least one of the housing 512 or the setscrew sleeve 514. The cap 510 may be threadedly or otherwise secured to the chamber 526 and may reduce or prevent debris from entering the chamber 536.

Figure 13:
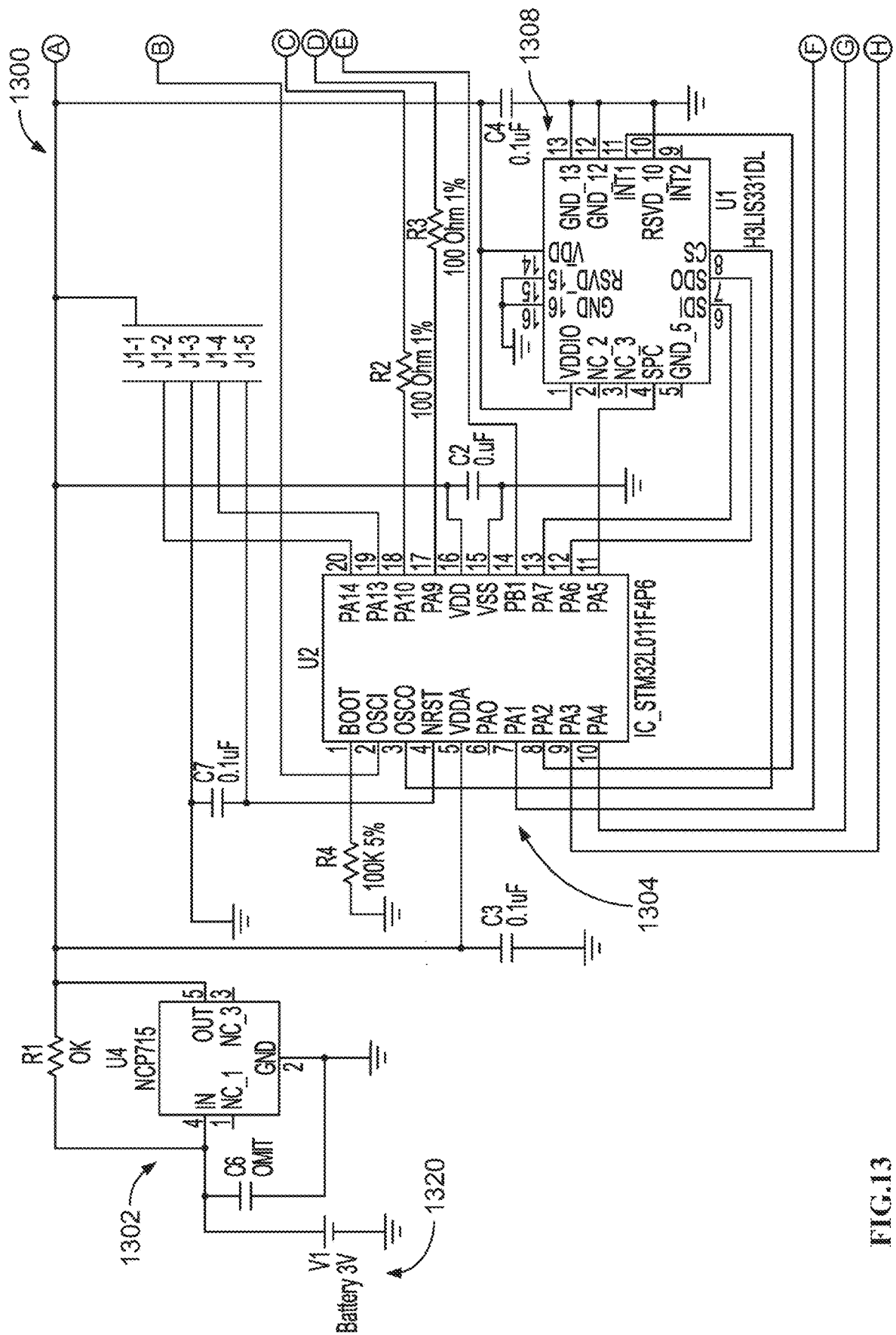
FIG. 13 is a schematic of a circuit board of wheel speed sensor in accordance with the present disclosure.
Figure 13:
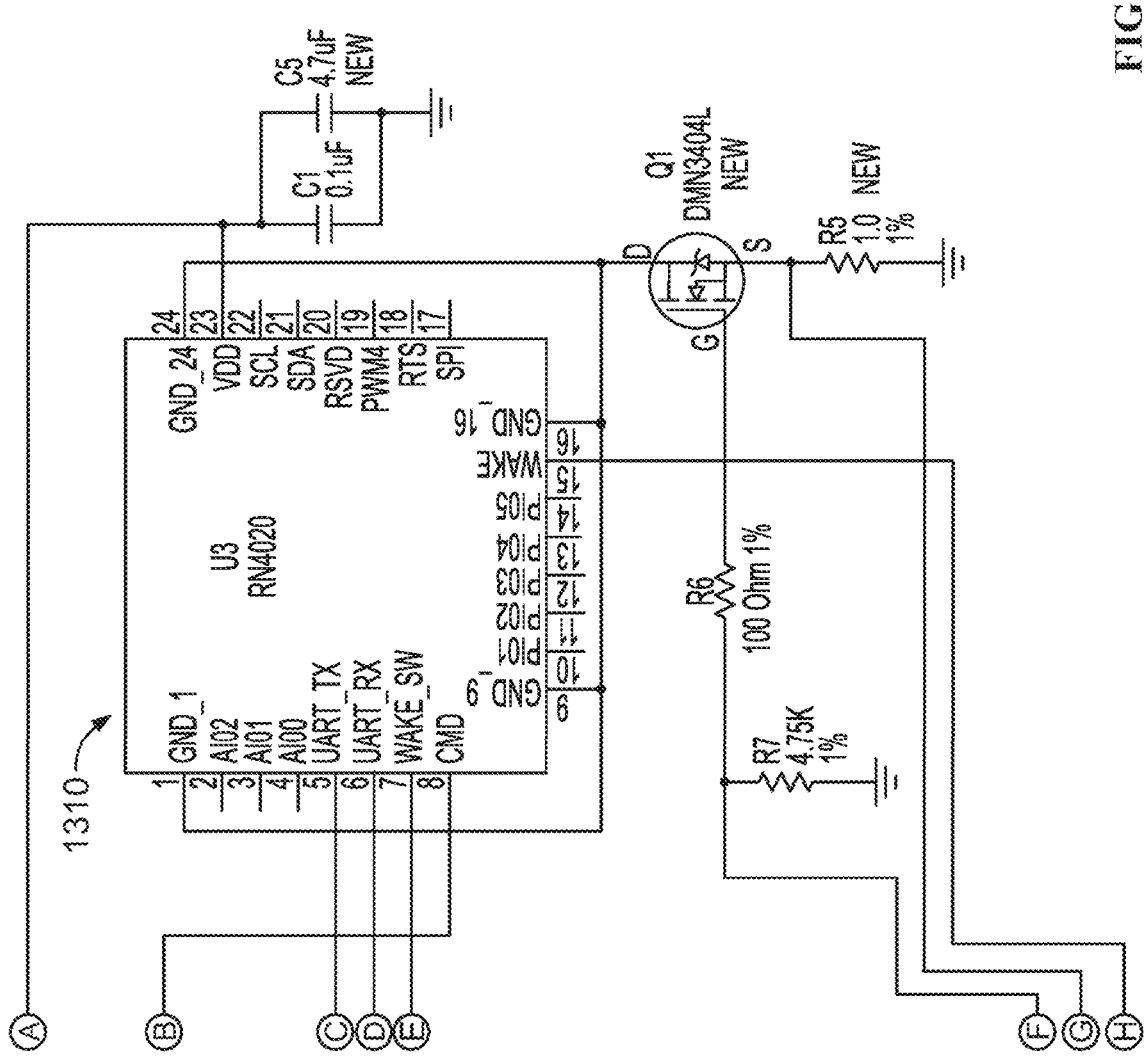

It is noted that tightening or loosening of the setscrew 30 does not cause the housing 512 to rotate. As such, the orientation of the circuit board 550 (which may comprise a controller, accelerometer, gyroscope, communication device, or the like) is not altered by the tightening or loosening. This may allow for ease of attachment or removal of the wheel speed sensor 500. For example, a user may remove the wheel speed sensor 500 to replace the tire 602, charge or replace the power source 552, or the like. Maintaining the orientation of the circuit board 550 may generally allow an accelerometer of the circuit board (as shown in FIG. 13, below) to maintain an operative orientation.

According to embodiments, the housing 512 may be generally weather proof and may seal various components of the wheel speed sensor 500 from an external environment, such as wind, water, or the like. In another aspect, the housing 512 may be generally shock proof to prevent damage to components housed within the housing. For example, the housing 512 may comprise a plastic, metal, or other material that may be capable of absorbing physical contact from loose debris on a roadway that may contact the housing 512.

It is not that the accelerometer may comprise a single, double, triple, or other m-axis accelerometer as described herein. Moreover, the power source 522 may comprise a replaceable, rechargeable, or other type of power source. In at least one example, the power source 552 may be rechargeable through kinetic motion (e.g., such as rotation of the wheel 602), wirelessly rechargeable (e.g., such as through induction), or the like. In another aspect, a charging port may be disposed within the chamber 526 such that the wheel speed sensor 500 need not be removed to charge the power source 552.

The wheel speed sensor 500 may be mounted on the lug nut 604 such that the a sensitive axis (e.g., an x-axis, y-axis, etc.) may be at a zero or an angle of p to q degrees, where p and q are numbers (e.g., between −10 and +10 degrees), to a tangent of a circle define by the lug nuts 604 of the wheel 602, rotation of the wheel 602 causes a centripetal force along the radius of the circle. In some embodiments, a user may utilize a mobile device to adjust the angle as described herein. The force may be dependent on the wheel speed, size of the wheel, or the radius of the circle. A component of this centripetal force may be present and sensed along the axis that is generally at a slight angle to the tangent. The centripetal force is a function of the square of the velocity of the wheel. Thus the accelerometer predominantly measures the centripetal force which represents the speed of the towed vehicle. It is noted that the accelerometer may be mounted at other angles and transfer functions may be utilized to interpret the angles and measure the wheel speed. As such, reference to specific angles is for exemplary purposes and this disclosure contemplates other operative mounting angles.

According to an exemplary embodiment, calibration for mounting of the wheel speed sensor 500 may be done at standstill by positioning the wheel 602 such that the lug nut 604 for mounting the wheel speed sensor 500 is at 12' o-clock position. A user device, such as user device 300, a brake controller, or another device may communicate with the wheel speed sensor 500 to receive readings from the accelerometer. In an example, the user device may display a current reading of the accelerometer or may indicate whether or not the wheel speed sensor 500 is in an operative position. The user may then adjust the wheel speed sensor 500 to an operative position and the user device may verify the position as an operative mounting position. Once in the operative position, the user may tighten the setscrew 530.

In another aspect, the user device may provide an interface that allows a user to draw or select the position of the wheel speed sensor 500 and position of lug nut 602. The user device may identify an operative mounting position based on a comparison of readings from the accelerometer and the position of the wheel speed sensor 500 and position of lug nut 602. The operative mounting position may be displayed on a screen or the like. For at least one embodiment, the user device may utilize a camera to capture a position of the wheel speed sensor 500 or position of lug nut 602 and may render instructions on how to adjust the position of the wheel speed sensor 500. As an example, the user device may comprise a wireless communications device (e.g., smart phone, tablet computer, wearable computer, etc.) that may execute a software program or application to help adjust the position of the wheel speed sensor 500 by providing a user with real-time adjustment instructions. These instructions may include rotating in a certain direction (e.g., clockwise, counter-clockwise, etc.) or otherwise positioning the wheel speed sensor 500 relative a wheel. The instructions may be visually displayed on a screen (e.g., via text, graphics, etc.), audio instructions, tactile instructions, or the like. The instructions may direct positioning of the wheel speed sensor 500 such that at least one sensitive axis of the accelerometer may be at a slight angle to the tangent of the circle passing through lug nut when it is mounted.

In some embodiments, the user may enter information associated with the wheel into a user device or brake controller, such as the radius of the wheel, radius of the circle defined by the lug nuts, or the like.

It is noted that the user may iterate attachment and removal of the wheel speed sensor 500 as desired. The user may utilize a user device or other device to verify the operative mounting position for each iteration. It is further noted that the wheel speed sensor 500 may include an interface that may allow the wheel speed sensor 500 to communicate whether it is in a operative mounting position. For instance, an LED light, display screen, audio device, or other interface may be coupled to the circuit board 550. The user may press a button to activate a calibration process and/or tightening of the setscrew 530 may activate the calibration process. The interface may indicate a direction to which a user should rotate the wheel speed sensor 500 and may indicate whether the wheel speed sensor 500 is in an operative position. It is noted that other devices may be utilized such as a level (e.g., bubble level) or the like.

FIG. 13 illustrates an exemplary schematic diagram of a circuit board 1300 for a wheel speed sensor, such as circuit board 550 shown in FIG. 11. The circuit board 1300 may generally include a processor 1304, an accelerometer 1308, a communication device 1310 (which may include a BLUETOOTH transmitter/receiver), and a voltage regulator 1302 coupled to a power supply 1320. It is noted that the circuit board 1300 may comprise similar aspects as described with reference to the wheel speed sensors of the various disclosed figures.

While the accelerometer 1308 is described, it is noted that other speed sensors, such as gyroscopes may be utilized. Moreover, the communication device 1310 may comprise other or additional types of wireless communication devices other than a BLUETOOTH communication device. For instance, the communication device 1310 may generally comprise a similar type of communication device as a brake controller or a user device such that the communication device 1310 may operatively enable communication with the brake controller of the user device. The communication device 1310 may communicate a sensed wheel speed, deceleration, or other information as described herein.

Figure 14:
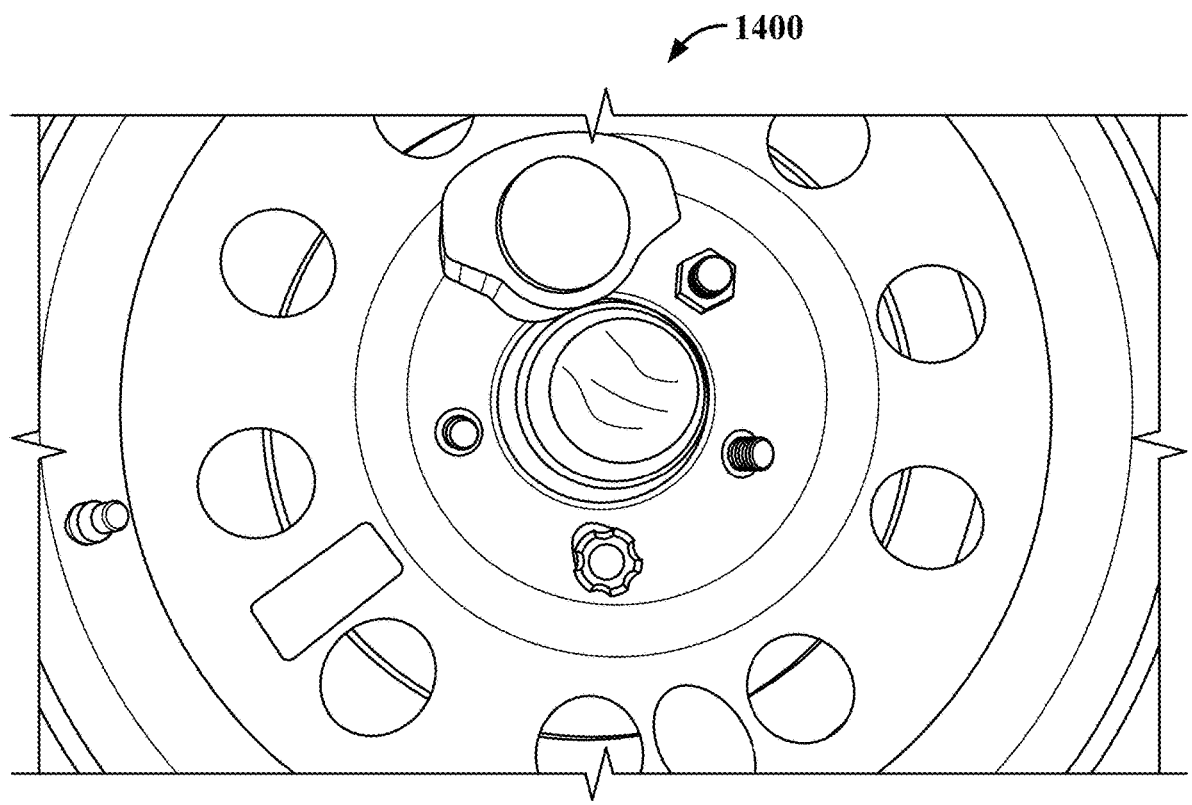
FIG. 14 is a prototype wheel speed sensor attached to a wheel in accordance with the present disclosure.

FIG. 14 illustrates an exemplary prototype 1400 of a wheel speed sensor as described herein. It is noted that the prototype 1400 provided positive results of speed tests that were generally as accurate as traditional towing vehicle speed sensors.

As used herein, the terms "component," "module," "system," "interface," "platform," "service," "framework," "connector," "controller," or the like are generally intended to refer to a computer-related entity. Such terms may refer to at least one of hardware, software, or software in execution. For example, a component may include a computer-process running on a processor, a processor, a device, a process, a computer thread, or the like. In another aspect, such terms may include both an application running on a processor. Moreover, such terms may be localized to one computer and/or may be distributed across multiple computers.

While methods may be shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more users, mechanical machines, automated assembly machines (e.g., including one or more processors or computing devices), or the like.

What is claimed is:

1. A wheel speed sensor device for a towed vehicle, comprising:
   a housing;
   an accelerometer housed within the housing;
   a wireless communication device coupled to the accelerometer and housed within the housing; and
   an attachment mechanism operatively attaching the housing to a lug nut of a wheel of the towed vehicle, the attachment mechanism comprising an attachment member having a first end and a second end, the first end having at least two prongs extending therefrom and defining a generally annular opening for receiving the lug nut and a spring extending from the second end thereof, a setscrew, and a setscrew sleeve, wherein the setscrew sleeve is shaped to slidingly receive the attachment member therein and the housing is shaped to slidingly receive the setscrew sleeve therein such that tightening the setscrew into the setscrew sleeve forces the housing and the setscrew sleeve towards the lug nut forcing the prongs to be received in the setscrew sleeve compress the prongs against the lug nut thereby securing the attachment mechanism to the lug nut.

2. The wheel speed sensor device of claim 1, wherein the wireless communication device is a BLUETOOTH device.

3. The wheel speed sensor device of claim 1, further comprising a setscrew that operatively tightens or loosens the attachment member to the wheel.

4. The wheel speed sensor device of claim 1, further comprising a power source operatively coupled to the accelerometer and the wireless communication device and housed within the housing.

5. The wheel speed sensor device of claim 4, wherein the power source comprises a rechargeable power source.

6. The wheel speed sensor device of claim 5, wherein the power source operatively recharges via kinetic energy.

7. The wheel speed sensor device of claim 4, wherein the power source comprises a disposable power source.

8. A wheel speed sensor system for a towed vehicle, comprising:
   a housing;
   an accelerometer housed within the housing;
   a wireless BLUETOOTH device communication device coupled to the accelerometer and housed within the housing; and
   an attachment mechanism operatively attaching the housing to a lug nut of a wheel of the towed vehicle, the attachment mechanism comprising an attachment member having a first end and a second end, the first end having at least two prongs extending therefrom and defining a generally annular opening for receiving the lug nut and a spring extending from the second end thereof, a setscrew, and a setscrew sleeve, wherein the setscrew sleeve is shaped to slidingly receive the attachment member therein and the housing is shaped to slidingly receive the setscrew sleeve therein such that tightening the setscrew into the setscrew sleeve forces the housing and the setscrew sleeve towards the lug nut forcing the prongs to be received in the setscrew sleeve compress the prongs against the lug nut thereby securing the attachment mechanism to the lug nut.

9. The wheel speed sensor system of claim 8, the BLUETOOTH device of the sensor is in communication with a mobile device while the mobile device calibrates a position of the sensor.

10. The wheel speed sensor system of claim 8, further comprising a brake control unit operatively controlling brakes of a towed vehicle and in communication with the wireless BLUETOOTH device.

* * * * *